United States Patent
Del Zotto

[15] 3,636,357
[45] Jan. 18, 1972

[54] THRESHOLD DETECTOR FOR INCIDENT RADIATION

[72] Inventor: Giorgio Del Zotto, Milan, Italy

[73] Assignee: Ates Componeti Elettronici S.p.A., Milan, Italy

[22] Filed: Apr. 28, 1970

[21] Appl. No.: 32,658

[30] Foreign Application Priority Data

May 9, 1969 Italy..................................16618 A/69

[52] U.S. Cl..............................250/210, 317/124, 315/159
[51] Int. Cl.......................................................H01j 39/12
[58] Field of Search...................250/210, 214; 315/159, 158, 315/149; 307/311; 317/124, 130

[56] References Cited

UNITED STATES PATENTS

| | | | |
|---|---|---|---|
| 3,409,840 | 11/1968 | Campbell | 250/210 X |
| 3,458,770 | 7/1969 | Denger | 315/159 X |
| 3,094,617 | 6/1963 | Humphries et al. | 250/210 X |
| 3,273,752 | 9/1966 | Horeczky | 250/210 X |

Primary Examiner—Walter Stolwein
Attorney—Karl F. Ross

[57] ABSTRACT

A resistance bridge, having one diagonal connected across a source of direct current, includes in its other diagonal the base/emitter circuit of an input transistor controlling a switching transistor of the opposite conductivity-type. The latter transistor controls a relay which operates when a photoresistor in one of the arms of the bridge is illuminated; a regenerative feedback connection from the output of the switching transistor exerts a toggle effect by modifying the bias of the input transistor to vary the sensitivity of the detector in a sense tending to maintain the relay in either its operated or its unoperated state.

6 Claims, 1 Drawing Figure

PATENTED JAN 18 1972
3,636,357
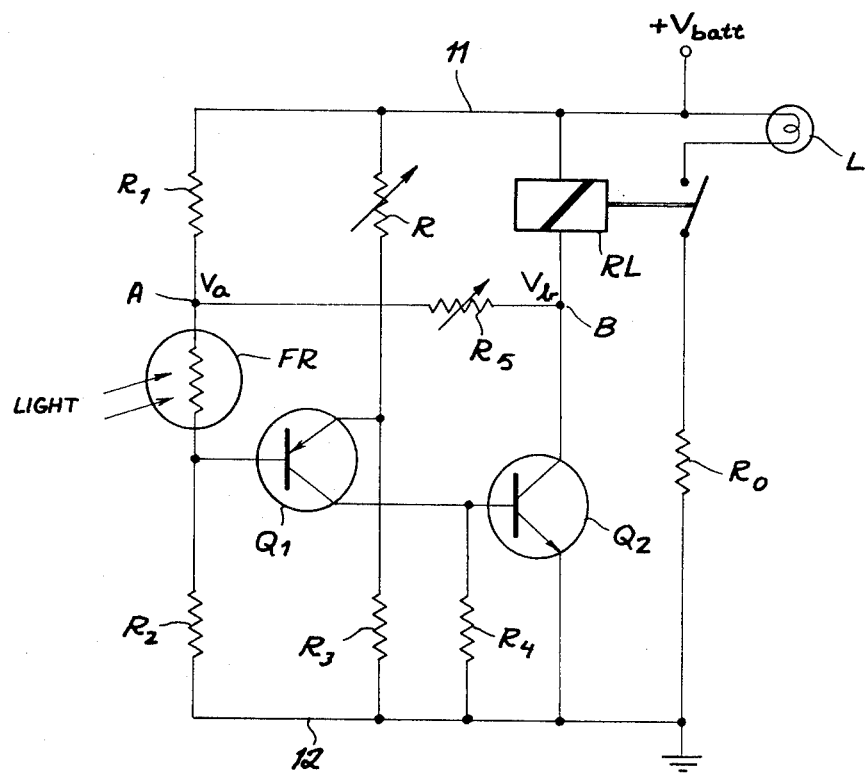
Giorgio Del Zotto
INVENTOR.
BY
Karl G. Ross
Attorney

THRESHOLD DETECTOR FOR INCIDENT RADIATION

My present invention relates to a circuit arrangement for detecting ambient light or other incident radiation in order to operate a load in response to a predetermined change in the intensity of that radiation.

Such a system has utility, for example, in connection with a light or set of lights to be turned on automatically at dusk and to be switched off automatically at dawn. Typical for such field of application are the courtesy lights of an automotive vehicle in jurisdictions requiring the illumination of the contours of an automobile parked in the street. Other instances are porch lights and indoor illumination of dwellings whose owners wish to create the impression of nighttime occupancy.

The use of a radiation-sensitive resistance element, such as a photodiode, readily suggests itself for this purpose. One disadvantage of conventional circuitry using photodiodes is their thermal sensitivity which causes variations in their luminous threshold with changes in ambient temperature. Such thermal sensitivity also manifests itself with similar disadvantageous effect in transistors used to amplify the photodiode output.

An object of my present invention, therefore, is to provide an improved radiation detector of the character referred to which is substantially insensitive to variations in ambient temperature.

The conductivity of photodiodes as well as transistors is also affected by changes in the supply voltage. When the power supply is the battery of an automotive vehicle, for example, the supply voltage may vary considerably from one day to the next. Thus, another object of my invention is to provide a radiation detector of this description which is substantially insensitive to moderate fluctuations in the supply voltage.

A further object of my invention is to provide a system wherein the effective response threshold of a photoresistor or equivalent radiation-sensitive element can be modified so as to be different for the cut-in and the cutout, thereby creating a toggle effect which prevents any untimely switching of the load by minor variations in the level of incident radiation (e.g., illumination of the sensor by the beam of a passing vehicle at night).

In my copending application Ser. No. 879,461, filed Nov. 1969, I have disclosed a radiation-sensitive threshold detector with a resistive bridge network having one diagonal connected across a direct current source and including in its other diagonal a photodiode in series with the base/emitter circuits of two transistors of opposite conductivity types, i.e., an NPN-transistor and a PNP-transistor. The second transistor included in this bridge network has its collector connected in series with an input circuit of a transistorized amplifier comprising two transistor stages whose conductivity type is the same as that of the first transistor (e.g., NPN). The load circuit includes a relay serving for the alternate energization and deenergization of a controlled device (e.g., a lamp) in response to variations in the level of radiation incident upon the sensor. In its turn, the relay controls a switch for modifying the bias of one of the transistors forming part of the bridge network for the purpose of feeding back a signal tending to stabilize the relay in its operated or unoperated condition. Owing to the resulting toggle effect, the control circuit for the relay responds to different threshold levels of the sensor output in switching from one operating condition to the other.

In contradistinction to my prior system, my present invention replaces the relay-controlled toggle switch by a purely electronic circuit, i.e., by a regenerative feedback path between the output and the input of an amplifier preferably consisting of two transistor stages. The first of these stages, referred to hereinafter as the control transistor, has its input connected across the output diagonal of a resistance bridge, similar to the aforedescribed network, which also includes a photoresistor in one of its resistive arms. The junction between this photoresistor and a series resistor included in that bridge arm is connected to an output terminal of the amplifier, such as the collector of the second stage referred to hereinafter as the switching transistor, for modifying the bias of the control transistor in response to a change in the conductivity of the switching transistor. Thus, my improved system entails a substantial simplification drastically reducing the number of transistors required.

The invention will be described in greater detail hereinafter with reference to the accompanying drawing the sole FIGURE of which shows a circuit diagram of a representative embodiment.

The system shown in the drawing comprises a pair of bus bars 11, 12 connected across a source of direct current $V_{batt}$ such as an automotive battery having a ground negative terminal tied to bus bar 12 and a positive terminal tied to bus bar 11. Between these terminals lies a load in the form of a lamp L in series with a ballast resister $R_o$ and an armature and front contact of a relay RL.

A resistance bridge constituted by four resistors R, $R_1$, $R_2$, $R_3$ has its input diagonal connected between bus bars 11, 12 and further includes a photoresistor FR in series with bridge arm $R_1$. The output diagonal of the bridge is connected across the base/emitter circuit of a first or control transistor $Q_1$ whose collector is tied to the base of a second or switching transistor $Q_2$; the two transistors are of opposite conductive types, i.e., of PNP-type in the case of the former and NPN-type in the case of the latter, and together form a two-stage signal amplifier. The output circuit of transistor $Q_2$ is in series with the winding of relay RL, with its emitter grounded at bus bar 12 and its collector connected to bus bar 11 by way of that winding. The base of transistor $Q_2$ is biased by a resistor $R_4$ while a further resistor $R_5$ lies between the junction A of resistor $R_1$ with photoresistor FR and the junction B of the relay winding with the collector of transistor $Q_2$.

Resistor $R_5$ forms part of a regenerative feedback path from the output to the input of the two-stage amplifier $Q_1$, $Q_2$. Resistors R and $R_5$ are shown to be adjustable.

In daylight, i.e., when photoresistor FR is strongly illuminated and its resistance is relatively low, the base of transistor $Q_1$ is driven positive with reference to the emitter whose potential is determined by the voltage divider consisting of resistors R and $R_3$. Under these conditions the transistor $Q_1$ is cut off, as is the transistor $Q_2$ whose base is then effectively grounded. Relay RL is unoperated so that lamp L is not lit. The input voltage $V_a$ (at point A) and the output voltage $V_b$ (at point B) are both near the supply voltage of positive bus bar 11.

When the photoresistor FR is subjected to reduced illumination, as by a shadow falling on it, the base voltage of transistor $Q_1$ goes more negative but the transistor does not become conductive until the effect of the positive potential at point B has been overcome. When this happens, both transistors $Q_1$, $Q_2$ are turned on and the consequent lowering of output voltage $V_b$ exerts a toggle effect accelerating the saturation of the amplifier. This results in an alternate stable condition in which even an illumination of photoresistor FR by a light source of limited intensity will not cut off the transistor $Q_1$ to release the relay RL. Such release will occur only upon a sufficient irradiation of the photoresistor to overcome the virtual grounding of point B by the saturated transistor $Q_2$.

It will be apparent that the cut-in threshold can be varied by the adjustment of resistor R and that the cutout threshold can be similarly altered by the adjustment of resistor $R_5$; with the resistance of the relay winding (together with any resistor in series therewith) high compared to that of resistor $R_1$, the setting of resistor $R_5$ will have but a negligible effect upon the first-mentioned threshold.

Thus, the two variable resistors R, $R_5$ can be used to change at will the hysteresis or toggle effect that prevents a switchover from one stable condition to the other upon a change in illumination by less than a predetermined magnitude which may be different for the two switching conditions.

The change $\Delta V_a$ in the input voltage of the amplifier is proportional to the voltage swing $\Delta V_b$ of its output by a feedback factor $1/\beta$ where $\beta \approx R_5/R_1$.

The voltage swing $\Delta V_b$ is, of course, the difference between the values of $V_b$ with transistor $Q_2$ either cut off or saturated.

I have found, in practical tests, that such a system may be insensitive to substantial variations in supply voltage, e.g., between 8 and 16 volts, as well as in ambient temperature, e.g., between −20° and +75° C. The upper and lower thresholds of luminous intensity may be at 400 and 100 lux, respectively, with a drift of less than 1.5 lux/°C in response to temperature changes and less than 15 lux/V in response to voltage fluctuations.

Lamp L is representative of any light source controlled in response to ambient luminosity, e.g., the courtesy lights of a parked automotive vehicle.

I claim:

1. A circuit arrangement for detecting incident radiation, comprising a source of direct current; a resistance bridge having one diagonal connected across said source; a radiation-sensitive resistance element and resistance means serially connected in an arm of said bridge; a signal amplifier having an input connected across the other diagonal of said bridge; a load circuit including relay means connected to the output of said amplifier for alternate energization and deenergization in response to variations in the level of radiation incident upon said resistance element; and regenerative feedback path constituted by a conductive connection extending from said output to a junction between said resistance means and said resistance element.

2. A circuit arrangement as defined in claim 1 wherein said feedback path includes an adjustable resistor.

3. A circuit arrangement as defined in claim 1 wherein said relay means has a winding in series with a pair of output electrodes of said amplifier, said feedback path originating at a junction of one of said output electrodes with said winding.

4. A circuit arrangement as defined in claim 3 wherein said amplifier comprises a first transistor stage of one conductivity type and a second transistor stage of opposite conductivity type, said one of said output electrodes being a collector of said second stage.

5. A circuit arrangement as defined in claim 4 wherein said first stage has an emitter connected to a junction of two other arms of said bridge, one of said other arms including an adjustable resistor.

6. A circuit arrangement as defined in claim 4 wherein said load circuit forms a resistive connection including said winding between said collector and a terminal of said source, the resistance of said resistive connection being high compared with that of said resistance means.

* * * * *